United States Patent [19]

Jones, Jr.

[11] Patent Number: 4,712,235
[45] Date of Patent: Dec. 8, 1987

[54] METHOD AND APPARATUS FOR IMPROVED CONTROL AND TIME SHARING OF AN ECHO CANCELLER

[75] Inventor: Gardner D. Jones, Jr., Raleigh, N.C.

[73] Assignee: International Business Machines Corporation, Armonk, N.Y.

[21] Appl. No.: 672,968

[22] Filed: Nov. 19, 1984

[51] Int. Cl.[4] ............................................. H04B 3/23
[52] U.S. Cl. ................................... 379/410; 379/406
[58] Field of Search .............. 179/170.2, 170.6, 170.8; 370/32, 32.1; 379/406, 407, 410, 411

[56] References Cited

U.S. PATENT DOCUMENTS

| 3,499,999 | 3/1970 | Sondhi | 379/411 X |
| 3,828,147 | 8/1974 | Ochiai et al. | 379/410 |
| 4,012,603 | 3/1977 | Araseki et al. | 379/406 |
| 4,057,696 | 11/1977 | Gitlin et al. | 379/411 |
| 4,129,753 | 12/1978 | Duttweiler | 379/410 |
| 4,360,712 | 11/1982 | Horna | 379/406 |
| 4,405,840 | 10/1983 | Zebo | 379/411 |
| 4,426,729 | 1/1984 | Gritton | 381/41 |
| 4,491,701 | 1/1985 | Duttweiler | 364/724 |

FOREIGN PATENT DOCUMENTS 2008903  6/1979  United Kingdom .

Primary Examiner—Jin F. Ng
Assistant Examiner—R. Vaas
Attorney, Agent, or Firm—Edward H. Duffield

[57] ABSTRACT

An improved echo canceller control method utilizes two adaptive level detectors for controlling or inhibiting the updating of coefficients in the echo canceller. Updating is permitted only when an actual received signal is present and no transmit signal as measured by the adaptive level detector exists. During periods when no transmit or receive signals are present, update is inhibited and the adaptive level detector establishes a noise reference level. When transmission activity is present but no receive activity is present, inhibiting of the echo canceller updating allows the adaptive level detector to seek and establish the background noise reference level and avoids the disruption of the echo canceller coefficients that would occur from double talk if a receive signal were suddenly to become present. When actual double talk, i.e., both receive and transmit activities are present occurs, updating is also inhibited for the same reason. Since channel activity is typically present only 30-40% of the time in either transmit or receive mode, the echo canceller will spend the remaining 70-60% of its time inhibited and can be shared with other channels which do have the appropriate activity for updating separate echo canceller coefficients. If the coefficients are separately stored in association with each channel as is the case in this invention, the echo canceller coefficients are loaded whenever updating is to take place for a given channel.

8 Claims, 11 Drawing Figures

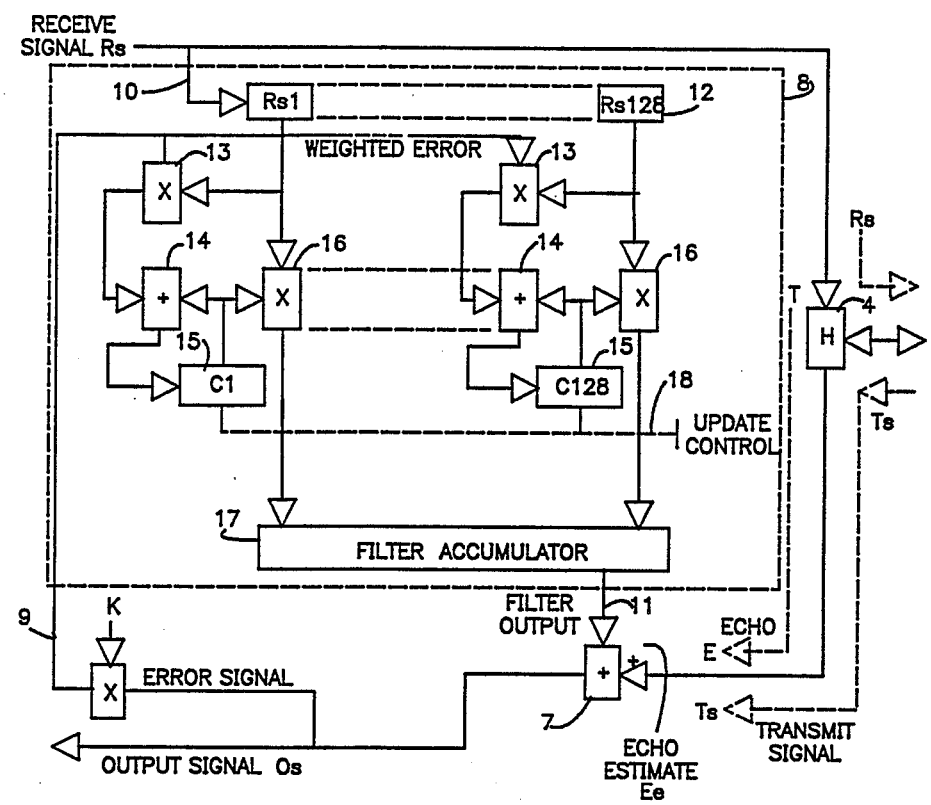

METHOD AND APPARATUS FOR IMPROVED CONTROL AND TIME SHARING OF AN ECHO CANCELLER

FIELD OF THE INVENTION

This invention relates to telecommunications techniques and apparatus in general and in particular to voice communications over telephone equipment experiencing echo distortion. Digital transmission systems using time assigned speech interpolation, for example, are a prominent application for this invention.

PRIOR ART

In most echo canceller implementations, divergence in the echo canceller tap coefficients occurs when the near end talker signal is present. These echo cancellers are normally used for toll trunk transmission and satellite channels where the double talk requirements do not permit the use of echo suppressors. When low rate speech encoding techniques are utilized to lower the transmission cost and to occupy more of the available bandwidth in a digital channel, precise echo control becomes more critical. When double talk occurs, a transmitted signal to the echo canceller includes both the echo from the received transmission and the near end speech signal. The calculation of the filter coefficients will be greatly disturbed by what appears to be a large and uncorrelated noise signal in comparison with the receive signal. The canceller coefficients will start to diverge widely. This is pointed out by Ochiai et al in an article entitled "Echo Canceller with Two Echo Path Models," appearing in the IEEE Transactions on Communications, Vol. COM-25, No. 6, pgs. 589–595, dated June, 1977.

The most direct solution to the problem is to stop the filter adaptation by ending updating of the filter coefficients whenever double talk occurs. A clock signal to the coefficient registers is inhibited by a control signal in the typical example. However, the conventional double talk detector used in echo suppressors in the prior art compares the receive signal and the transmit signal levels and does not have the response characteristics to meet the requirements for controlling coefficient update for an echo canceller as pointed out in the reference noted above. Another prior art proposal for solving the problem involves computing two echo path models, one for filter updating and the second for echo cancellation. This approach essentially doubles the complexity of the canceller and increases what is already a demanding processing task. In addition, this approach will result in dedication of the canceller functions to a single port and will prevent it from being multiplexed or time shared over multiple channels.

OBJECTS OF THE INVENTION

In view of the foregoing problems encountered in the known prior art, it is an object of this invention to provide an improved echo canceller or control utilizing two improved adaptive threshold detectors in place of the typical double talk detector to control an echo canceller control circuit.

A further object of the invention is to provide an improved echo canceller control utilizing the receive signal activity for controlling update of the filter coefficients which permits sharing of the echo canceller during non-updating periods.

SUMMARY

The foregoing and still other objects not specifically enumerated are met in the present invention by utilizing an adaptive threshold detector in place of the usual double talk detection circuits in an echo canceller control. This circuit facilitates immediately stopping updating as the onset of a transmit signal occurs. It has a significant advantage in that the echo canceller may then be shared over other lines when it is not updating the coefficients for a given line. Adaptive level detectors are utilized both for detecting reception signal activity and for detecting transmission signal activity above the adaptive level of noise and/or echo on the transmit line.

BRIEF DESCRIPTION OF THE DRAWINGS

The present invention will be illustrated and described with reference to a preferred embodiment thereof as shown in a drawing comprising the following figures.

FIG. 2 illustrates a prior art echo canceller of the typical sort commonly in use.

DETAILED SPECIFICATION

Figure 1A:
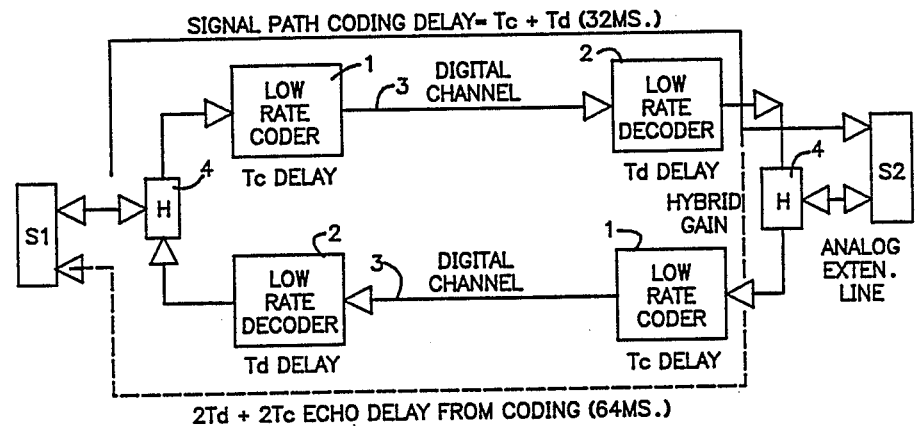
FIG. 1A illustrates a prior art general schematic diagram of a telephone transmission system utilizing low rate coders and decoders for transmission over a digital channel.

The echo canceller control apparatus and method of the present invention utilizes two adaptive threshold detectors. This allows near end talker signals that will normally cause divergence in the canceller adaptation algorithm to be detected relative to the receive signal echo. By use of the near end talker signal activity detection in conjunction with the conventional receive signal activity detection, the updating of the canceller filter coefficients is controlled to prevent filter divergence and improve the canceller's performance. Importantly, this method of control permits the echo canceller function to be shared in a multi-line system of the time sharing type such as the time assigned speech interpolation (TASI) system widely known. By utilizing an echo canceller in this fashion, a single adaptive filter can be utilized for a transmission channel rather than for only one port. In such TASI systems, the ratio of ports to channels varies from two or three to one. The ability to multiplex an adaptive filter function represents a considerable economic and hardware savings in such a system.

As an aid to understanding the context in which the present invention finds its utility, a brief review of the problems encountered in this field in the prior art is offered. The problem basically is identified as the problem of double talk noise. Double talk is defined as the situation in which both the transmitter and a receiver at one end of a communications link are simultaneously occupied with messages from both ends, i.e., both parties are talking. The control method and apparatus in the present invention can be used with a single transmission channel of either the analog or digital sort. However, its' advantage is most apparent when an integrated system employing low rate speech coders in conjunction with time assigned speech interpolation or the equivalent multiplexing techniques for efficient speech transmission in digital channels is employed.

Echo cancellers are widely used for toll trunk transmission and satellite channels. In such environments, double talk situations arise frequently and must be permitted to occur. These considerations rule out the use of echo suppressors which are effectively attenuators in the line utilized for the non-sending station to cut down on echo reflected to the transmitting station because this would greatly reduce any originating signal coming from the other end when double talk is present. Recently, low rate speech coding techniques have been utilized to lower the transmission costs associated with the usage of digital channels by compressing a number of speech signals into reduced bandwidth to thereby effectively share the cost of the digital channel over numerous users. This approach has fostered another application that requires precise echo control. Various low rate speech coding approaches are available including sub-band coding, adaptive transform coding and a variety of approaches based upon linear predictive coding. All of these allow near toll quality of speech transmission as perceived by a listener and utilize encoding rates in the range of 6000 to 16,000 bps. Common to all of the approaches contemplated is a relatively long processing delay encountered in both the encoding and decoding algorithm operations. Typically the delay is on the order of 16 to 30 milliseconds depending upon the specific coding algorithm employed. The delays, of course, greatly increase the significance of and probability for conflicting echo returns.

FIG. 1 illustrates a typical prior art low rate coder application for transmitting speech signals over a digital transmission channel. The use of the low rate coders and decoders 1 and 2, respectively, to communicate over the digital transmission channel 3 can increase the echo return delay to greater than twice the usual coder and decoder process delay, or approximately 64 milliseconds for the example given in the figure. The example given in FIG. 1A shows stations S1 and S2 connected through the typical hybrid circuit 4 to the low rate coders and decoders for transmission and reception, respectively. A transmission from station S1 will proceed through hybrid circuit 4 to the low rate encoder 1 which will create a transmission coding delay due to the delay in processing the algorithm to perform low rate encoding. Transmission over the digital channel 3 will add a minimal delay which may or may not be negligible and the low rate decoder 2 will add an additional algorithmic processing delay for decoding. The total delay for transmission encoding and decoding is approximately 32 milliseconds as shown in this example. A signal received at station S2 through the hybrid circuit 4 connected therewith will also create an echo through the loss or leakage in the hybrid circuit 4 that will be received at this station's low rate encoder 1, delayed by an additional encoding delay, transmitted over the digital channel and decoded with another decoding delay until it appears as a delayed echo at the originating station S1. The total delay will be approximately twice that of the signal path or 64 milliseconds in this example.

The conventional annoyance of an echo is significant, however, low rate coders that use linear prediction as a mechanism for adapting to an input signal spectrum are also further degraded by an echo signal. These devices, particularly in the presence of double talk, perceive the echo as a second signal mixed with the input. The echo effect is non-linear since the coder will change its adaptation to match the composite input signal and the result will be lower quality for the true input signal. An echo canceller is required in this case because an echo suppressor cannot eliminate the double talk effect in such coders.

Figure 1B:
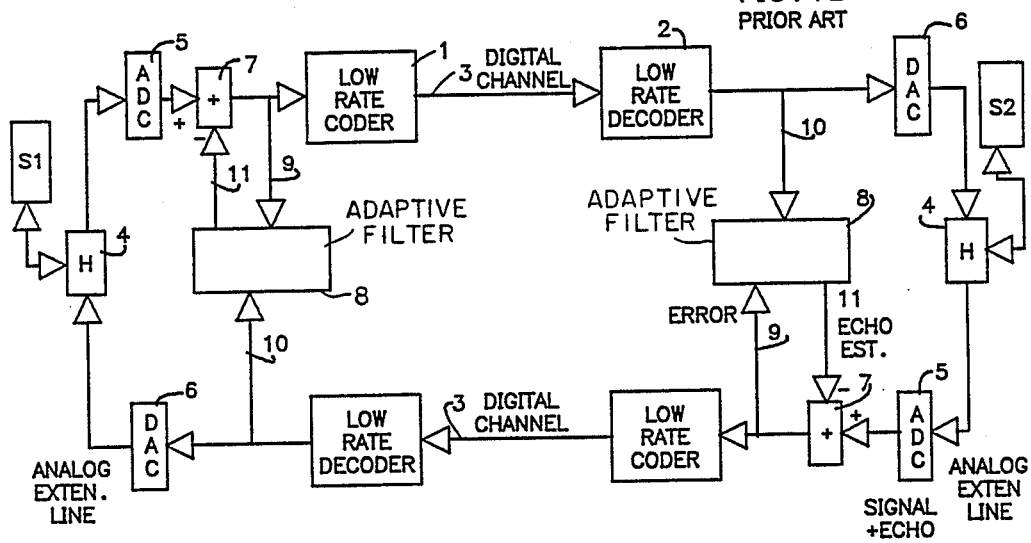
FIG. 1B illustrates a prior art telephone communications system utilizing a digital channel and employing echo cancellers at each end to reduce the echo observed at either party's end as a result of that party's transmission through the circuit as depicted in FIG. 1A.

Turning to FIG. 1B, a typical echo canceller system of known prior art is schematically depicted. It is assumed in this illustration that the coder and decoders each have a digital interface and that the speech signal entering the low rate encoder is represented by a pulse code modulated digital code of some sort. This is illustrated in FIG. 1B by the inclusion of the analog to digital converter 5 of a type well known in the art whose output passes through the canceller summation circuit 7 before it is applied to the low rate encoder 1. The echo canceller 8 receives an error input signal on line 9 to modify the correction coefficients. Echo canceller 8 also receives some of the received signal from far end source S2 over line 10. The echo estimate or correction is applied on line 11 to the summation circuit 7 to cancel out echo components reflected from the sending stations' signal as received at the far end and returned. At the receiving ends, each signal path includes a digital to analog converter to reconvert from digital format to analog signals for application to the hybrid circuits 4. FIG. 1B thus represents a typical prior art digital speech transmission system utilizing echo cancellers of a type well known in the art.

A typical echo canceller of the type well known in the prior art is shown in FIG. 2. The echo path, shown in dashed lines, results from a mismatch from the hybrid line balancing impedance and the actual input impedance of the analog extension line attached to the hybrid circuit for a user who listens or talks. The result is that some of the received signal Rs leaks through the hybrid circuit 4 into the transmission path to form an echo E. The echo canceller 8 is a typical digital transversal filter that contains a mechanism for adapting its coefficients in such a fashion that the filter response will match the leakage path response through the hybrid circuit 4. With the received input signal as an input on line 10, the filter output on line 11 is an estimate of the echo which is expected to occur, Ee. The echo estimate is used to cancel the actual echo signal in the combining circuit 7. The filter coefficients C1 . . . C128, generally referred to as Cs in FIG. 2, are determined by computing the correlation between the actual echo and the weighted echo error signal on line 9 represented as a constant K (E-Ee). The correlation between this error signal and the actual samples of the received signal delayed in time Rsi come from the delay line with taps R1 through R128 shown as the delay circuit 12. The correlation values are used for updating the filter coefficients C1 through C128 for example, according to the relations given in FIG. 2. It will be observed that for each coefficient, a delay tap output multiplied by a weighted error signal in the multiplier 13 is added to the original coefficient C in the combining circuit 14 and stored in the coefficient register 15. The output of the register 15 is combined with the tap output from the delay line 12 from that tap which corresponds with coefficient C1 by multiplication in the multiplying circuit 16 with the coefficient C1 for application to the filter accumulator 17, the output of which is the filter output or echo estimate, Ee.

Such filters are well known in the art and are not described in detail herein. The length of the adaptive filter, i.e., the number of taps employed, is a function of the impulse response of the hybrid leakage path. In general telephony applications, the filter length is typically 128 to 324 taps, where a tap is defined to be a unit of delay time equal to the sampling time or sampling rate in the digital system. In a typical example, a tap will be 125 microseconds of delay which assumes an 8000 sample per second digital sampling rate. In the case of extension lines in a line switching system, tap values in the range of 64 to 128 are suitable. The coefficients Cs are updated at the sampling rate of 125 microseconds if an 8000 sample per second digital sampling rate is employed. For signals having a wide dynamic range, the error weighting term K as shown in FIG. 2 may be divided by some measure of the received signal level such as its average value, mean square value, etc., to assure that the convergence rate of the canceller itself is uniform over the anticipated dynamic range of signal levels encountered. These details, of course, are well known in the field and are not a part of the present invention. They are described here to gain an understanding of how the present invention may be utilized.

In order for the echo filter coefficients Cs to correctly reflect good performance values using the correlation approach, the output signal E of the echo path must originate directly from the receiving signal path Rs. When double talk occurs, the transmitted signal to the echo canceller (located at the far end relative to each transmitter) will include both the echo signal and the near end speech signal Ts. When this happens, the calculation of the filter coefficients Cs will be greatly disturbed by what appears to be a large and, relative to the receive signal, uncorrelated "noise" signal. This will cause the canceller coefficient calculation to diverge from the true value. See the aforementioned IEEE article by Ochiai et al.

A most direct solution to the present problem might be to halt filter adaptation updating whenever double talk occurs. The clocking to the coefficient registers 15 may simply be inhibited by a control signal as indicated in FIG. 2 by the control update line 18. However, a conventional double talk detector circuit, not shown in FIG. 2, which may be used in echo suppressors will compare the received signal level Rs and the transmitted signal Ts level. However, this comparison will not have the response characteristics to meet the requirements for controlling the coefficient updating in the adaptive filter as pointed out in the aforementioned reference. Thus, this problem remains unsolved by this approach.

As noted in the aforementioned prior art section, one proposal for solving the double talk disturbance problem is to compute two echo path models, one for filter updating and the second for actual echo cancellation. This approach, as noted earlier, will double the complexity, cost and processing involved in what is already a very demanding processing task.

Having thus reviewed the general field of the invention and clearly demonstrated the existing problem, the present invention may now be clearly understood in light of its application to solving these problems.

Figure 3:
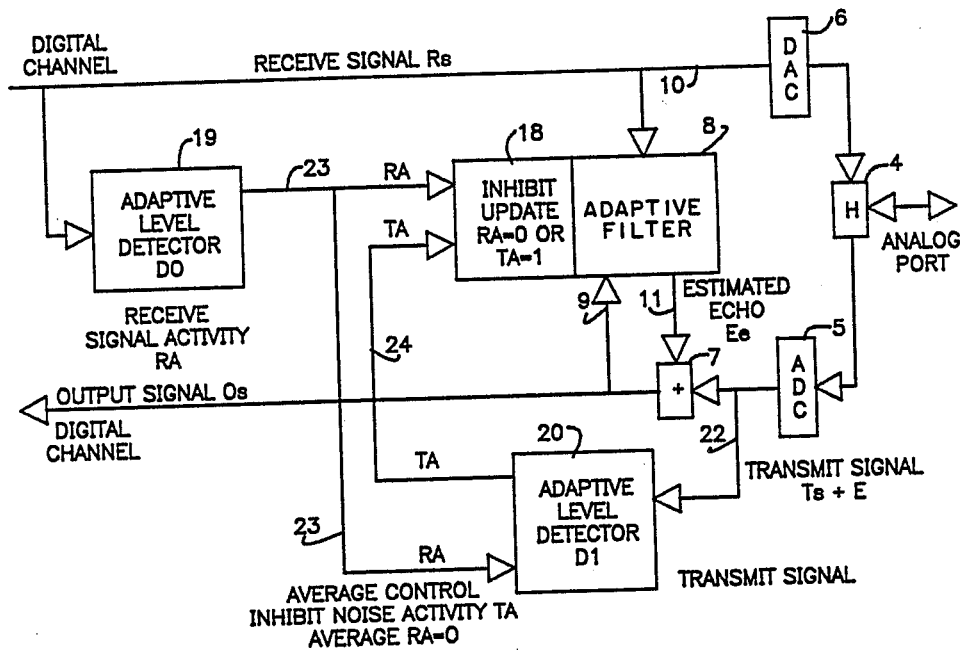
FIG. 3 illustrates the improved echo canceller control utilizing adaptive level detectors in accordance with the preferred embodiment of the present invention.

The generic form of a method and apparatus of the present invention is briefly illustrated for one end of a digital communication system in FIG. 3. The opposite end would be, of course, configured identically with the receive and transmit channels reversed.

FIG. 3 includes some components similar to FIGS. 1 and 2 and are numbered the same as shown in FIGS. 1 and 2. The remaining components and method of operation are different as will now be described. Some of the key components in FIG. 3 include the two adaptive level detectors 19 and 20 respectively. Such adaptive level or threshold detectors have been available for several years and are described in an article by G. A. Helwarth and G. D. Jones entitled, "Automatic Conditioning of Speech Signals," IEEE Transactions on Audio and Electro Acoustics, Vol. AU-16, pgs. 169-179, dated June, 1968. Such devices have been typically used for detecting the presence of speech in a background noise signal. They differ from fixed threshold detectors in that they have the ability to measure the noise level and activate a threshold when incoming signals exceed a given ratio of signal above noise. In essence, threshold detectors are activated when a predetermined signal to noise ratio is exceeded rather than when a fixed signal level is exceeded.

Figure 4:
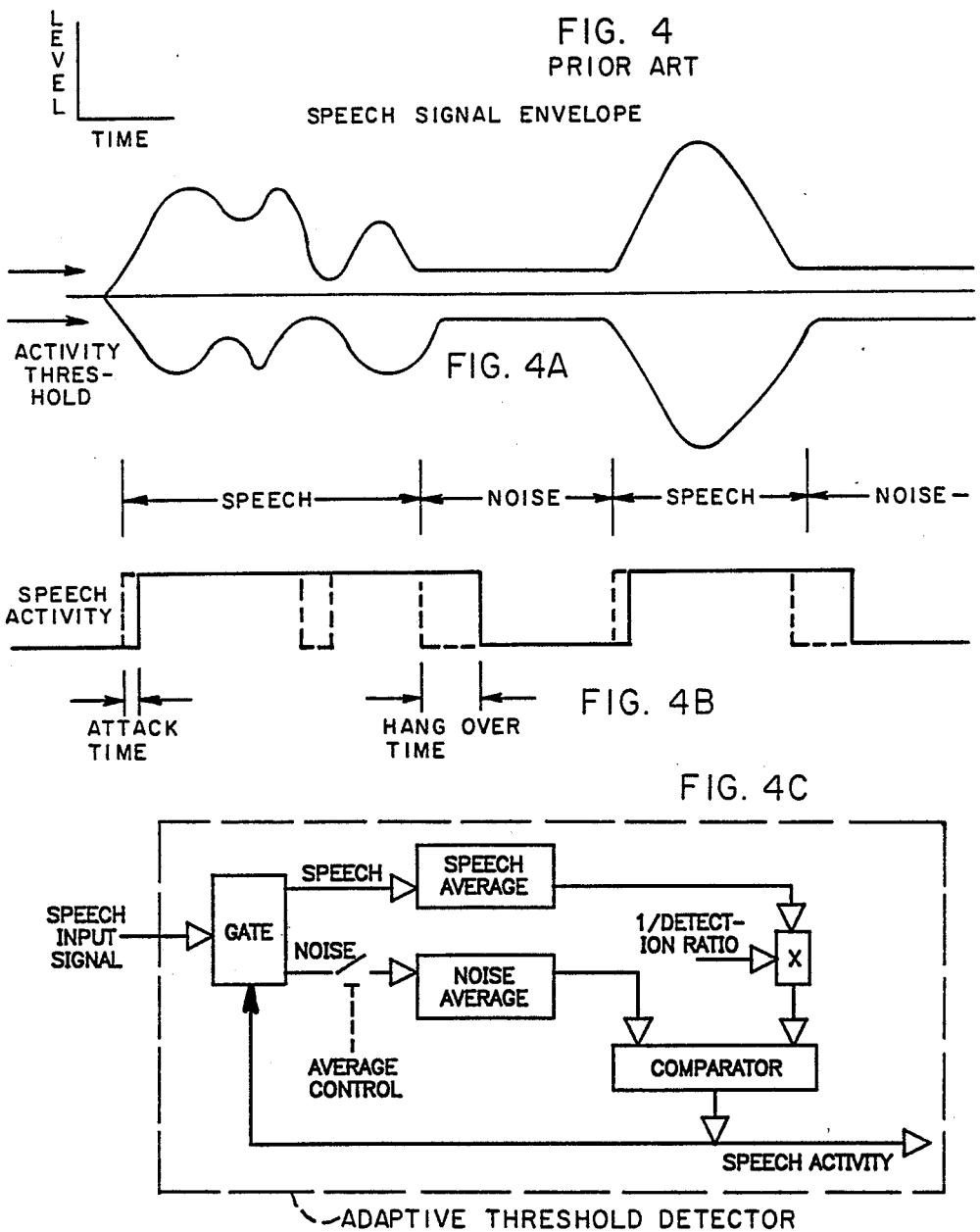
FIG. 4a–4c illustrate the prior art speech activity detection utilizing adaptive threshold detectors.

Digressing from FIG. 3 momentarily, FIG. 4 illustrates one example, such as that described in the aforementioned Helwarth et al article, of the many approaches for implementing a variable threshold detector. A pictorial definition of two of the critical parameters, namely, detection ratio and hangover time are also shown. The detection ratio is the ratio that the signal incoming must have in excess of the noise level to be declared an active signal. Ratios of 2 to 2½ are typically signal to noise ratio thresholds that are employed. This is an approximate 6 to 8 db range. The hangover time is the time that will elapse after the signal has fallen below the threshold before the output activity indication will be dropped. Hang over times of 20 to 50 milliseconds are typical in the industry and insure that activity remains correctly indicated during the normal interword speech nulls. Once a signal has exceeded the signal to noise threshold value, the noise averaging is temporarily halted and the current value is held in an average circuit memory. This prevents the estimated noise follower from being perturbed by the actual active signal energy. The attack time is shown in FIG. 4 and results from the initial signal average time which, with digital implementations and buffering, can be made to be 0. In this figure it is assumed that the adaptive threshold detectors used in the present echo control invention are implemented using digital processing and interface themselves directly to the circuitry with pulse code modulated digital signals as is current practice in the industry.

Returning now to FIG. 3, the echo canceller control will be described in greater detail.

As shown in FIG. 3, two adaptive threshold detectors are employed for the echo canceller control of this invention. The first detector 19 is used in the conventional manner to indicate activity of the receive signal Rs. The second adapter threshold detector 20 is new and is used to detect the presence of a transmission signal Ts over and above the existing echo level E. The output of detector 20 is the transmission activity TA signal on line 24. This is used to halt filter updating in the adaptive filter 8 by activating the inhibit update control 18. This prevents divergence of the filter characteristics are previously described.

The transmitting signal Ts is the signal from the near end user. It is important to note that when this signal is 0 the adaptive threshold detector 20 must not respond to the echo from the far end receive signal as an outgoing signal for use in the updating in the adaptive filter of the echo canceller. In order to detect the occurrence of a transmit signal Ts over the threshold of the echo E, the threshold of the detector 20 must operate in such a fashion that the echo E is considered to be noise rather than signal energy. At this point, a conventional detector would adapt in such a fashion that the noise average would reflect the background noise level of the transmission signal Ts. If the echo signal were larger than this noise, it would be detected as an outgoing signal as well.

In the present control technique, echo is measured as noise by the detector 20 having its noise average controlled by the received signal activity RA. This is the output of the adaptive level detector 19. This signal is provided to the adaptive level detector 20 and to the update control 18 as shown. In this manner, the noise average for detector 20 is updated only when receive signal activity is present and can be generating an echo signal. The threshold reference of detector 20 is the average of the echo signal and the background noise from the near end transmitter. If there is no echo leakage from the hybrid circuit 4, the noise average of detector 20 will revert to the background noise of the near end signal transmitter and the detector will operate as a conventional level detector.

The updating procedure is stopped immediately after the onset of a transmit signal activity because the delay in time in registering activity is the attack time of the threshold detector 20. This is normally a few milliseconds but can be made to be 0 by buffering. The ability to immediately stop updating of the coefficients in the adaptive filter canceller 8 is a significant advantage over the conventional double talk detectors that can often take a whole syllable or more before updating is actually stopped.

With the present technique, in accordance with this invention, updating is also stopped whenever the receive signal is inactive. Although the updating algorithm can theoretically adapt on the noise in the receive signal channel since a correlated echo would result, the filter stability is weak because of the low levels of the receive noise echo. A more robust stability is achieved if convergence is accomplished and maintained only when Rs (received signal activity) is actually present. As will be seen later, the use of the received signal activity for controlling updating for the echo canceller adaptive filter and for controlling the updating of the adaptive level detector 20's threshold is a key in providing the capability for multiplexing the functions of the adaptive filter 8 over a number of ports.

Controlling of updating in the invention is simply this: inhibit updating when either there is no receive signal activity or the transmission signal activity is present.

While an echo canceller control technique as described in the present invention is useful for single channel transmission, it is best utilized when integrated into a multi-line system where much of the canceller and control functions can be multiplexed over a number of ports.

As is well known in the art, the efficiency of speech transmission can be substantially increased by utilizing the statistical nature of voice activity. Experience has shown that during an average two-way telephone conversation, speech signal bursts are transmitted only 30 to 50% of the time. By selectively transmitting only the active signal portions of a conversation, the number of transmission channels required for a group of users can be greatly reduced. This is the basic technique for a number of approaches for increasing the transmission efficiency of speech signals. These began principally with the Bell System time assigned speech interpolation method in the 1950's. Typically, such systems have achieved compression gains in the range of 2 or 3 to 1 which means that the number of input signal ports is two or three times the number of output transmission channels.

The most effective speech transmission for digital channels is achieved by combining the TASI multiplexing approach with low rate speech coding. Such an approach is shown in FIG. 5 schematically.

Figure 5:
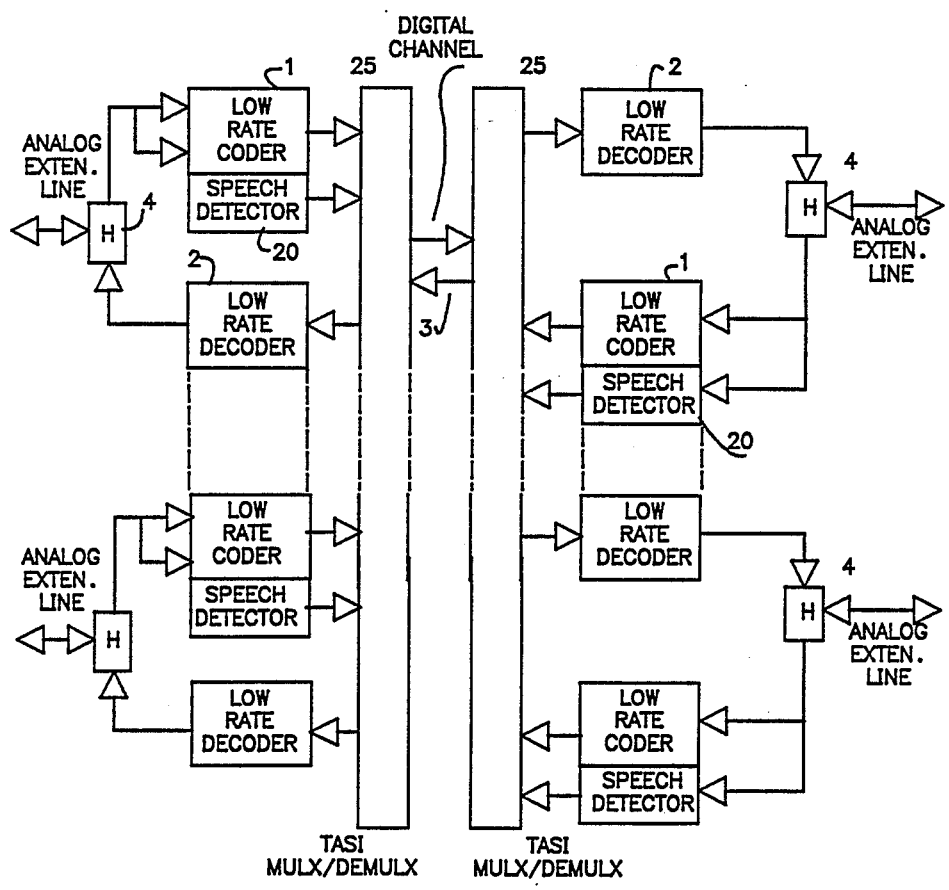
FIG. 5 illustrates a typical prior art trunk compression system using low rate coding and speech compression in a time assigned speech interpolation multiplexer and demultiplexer configuration.

FIG. 5 illustrates a typical prior art TASI multiplexed low rate coding and speech compression communication system utilizing a digital channel for the high speed link and a number of low speed ports connected to low rate coders and decoders for the users. The combination shown is used today in satellite transmission systems, trunk transmission concentrators between line switching systems, and private voice and data transmission links. It is anticipated that the use of such systems will become more prevalent as the availability of digital transmission facilities increases.

Figure 6:
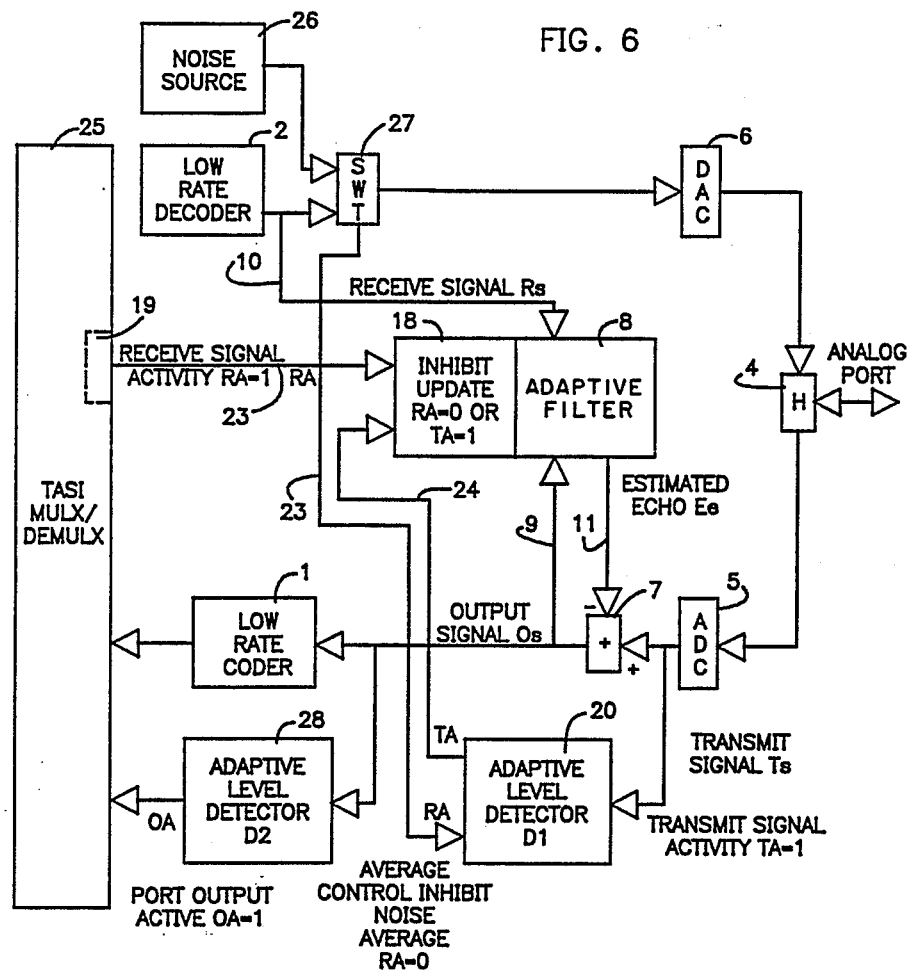
FIG. 6 illustrates the preferred embodiment utilizing an echo canceller control of the type employed in the present invention for a low rate time assigned speech interpolation transmission.

The present echo canceller control invention may be integrated in a TASI transmission system as shown in FIG. 6. The same general control flow plan as that in FIG. 3 is shown, but with modifications. The received signal activity indication that was provided by the adaptive level detector 19 in FIG. 3 is usually provided as a normal function in the TASI system with an activity detector located at the far end of the transmission link. Therefore, a separate received signal activity adaptive threshold detector 19 is shown as a dotted box on the received signal line 23 with the dotted box 19 included within the TASI multiplex/demultiplex system 25. In addition, most systems utilize a random noise signal generator 26 to provide to the receive port the subjective effect of a live line during speech silence periods. The switch 27 is connected to the low rate decoder to gate the noise source signals to the input whenever decoded output from the decoder 2 is not present. A second adaptive level detector 28 is used to indicate sending signal activity to the TASI system for requesting a transmission channel. The adaptive level detector employed in the present invention cannot provide this function since, in general, the detector 20 detects transmit signal over the echo signal but the detector 28 must indicate the transmission signal minus echo over the noise level. Where there is no echo present, the detectors 20 and 28 would have the same noise average. However, detector 28 is the receive signal detector for the far end of the transmission link and thus acts as the detector 19 for the far end system as shown by the dotted box 19 within the demultiplexer 25. It will be understood that the adaptive level detector 19 is actually a level detector 28 located at the transmission end from which the output signals on line 23 emanate.

Note that only the physical addition of the detector 20 is required as additional function in a TASI system in order to implement the inventive updating control procedure in a simple embodiment of the present invention. The method of operation, however, becomes quite different.

The echo canceller control of the present invention offers a significant advantage since it allows the adaptive filter function to be multiplexed over a number of ports. In FIG. 6, the adaptive filter 8 is operational and estimating the echo levels and being updated only when a received signal is actually present. The relative probability that a received signal is present is the usual speech activity ratio which gives a TASI system its great advantage. For most systems, the activity ratio used in computing the TASI advantage is between 0.3 and 0.5. This means that the echo canceller is not being updated more than half of the time due to the fact that the receive activity alone is not present more than half of the time. In addition, updating is stopped whenever the transmission activity is present, i.e., a double talk situation exists. Thus, when updating is stopped, current values in the filter tap coefficients may be held in registers until the updating resumes. The updating hiatus may last for several hundreds of milliseconds during a speaker's active conversation and it may be in hiatus for seconds while he is listening. During these times, the computational functions, the adders and multipliers, etc., all of which are shown in the typical adaptive filter as depicted in FIG. 2, are not being used. It is a simple matter to put the arithmetic resources of such an adaptive filter to use in computing, adding, multiplying, etc., for another port during such times. This is possible for the following reasons.

Returning to the example of FIG. 2, it will be noted that an adaptive filter of 128 taps has an impulse response of about 16 milliseconds at the given assumed sampling rate of 8,000 samples per second. Thus, given a hangover time of only 20 milliseconds, the filter coefficients will already be cleared of active signal when a received signal activity indication drops from a threshold detector of only a 20 millisecond hangover time. The longest filter impulse used in current cancellers is about 40 milliseconds, but this would still fit within conventional hangover time ranges of 20-50 milliseconds. Thus, at the end of the hangover time employed, the filter and other components of the echo canceller are available for use for another port.

Echo cancellation functions are only needed for a TASI port when an actual received signal is present. This means that the major functions of the adaptive filter are not used for much of the time. The response characteristics of the filter, updating control and the detector hangover time permit the filter to be multiplexed effectively over several ports. A adaptive filter per received port is no longer necessary. As an example, consider FIG. 7.

Figure 7:
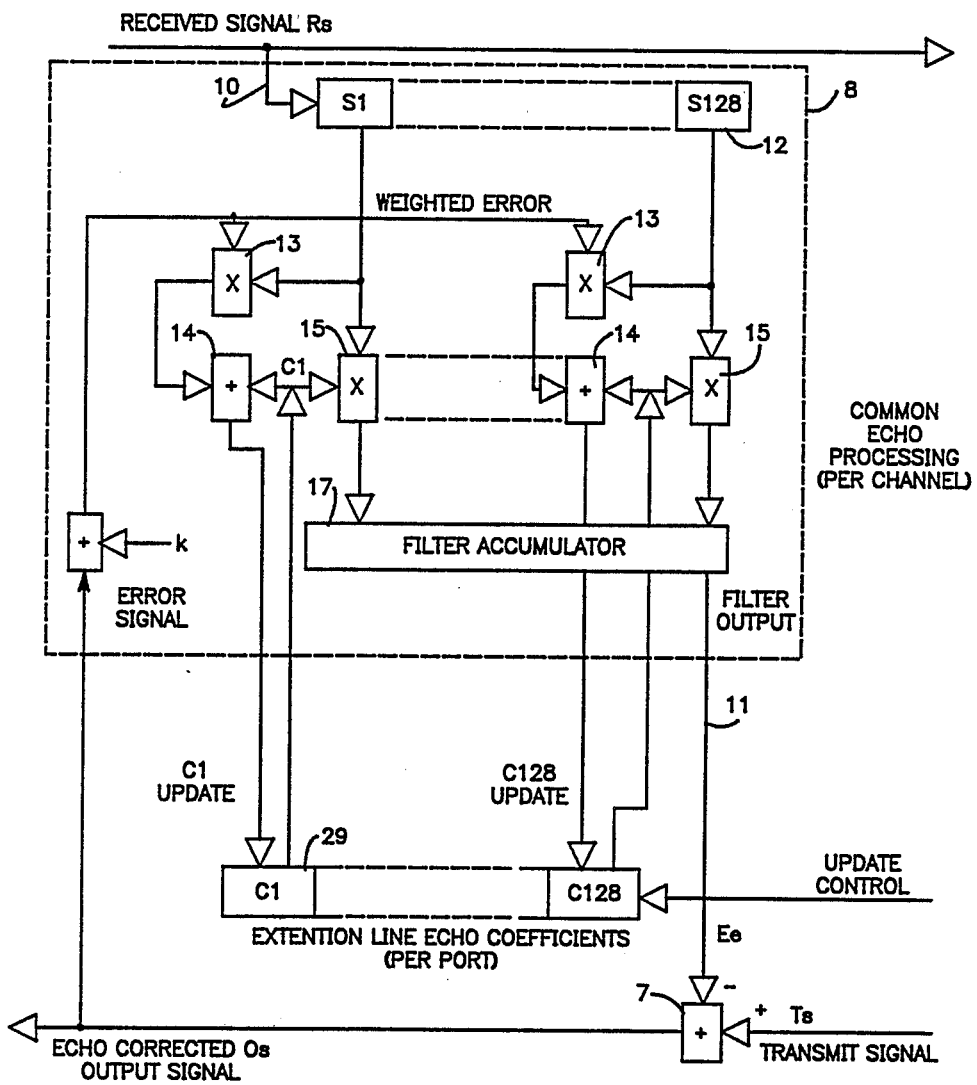
FIG. 7 illustrates a preferred embodiment of an echo canceller in accordance with the present invention which can be shared over a number of ports in a given channel.

FIG. 7 illustrates that only the transversal filter coefficients are unique to a given port or extension line and that the bulk of the echo computation is common processing function that may be multiplexed or shared over a number of ports with the processing servicing one port at a time. Once a port is to receive an active signal, the received signal activity output on line 23 of FIG. 6 will be present. This is because the far end adaptive level detector 28, functioning as the level detector 19, for example, in FIG. 3, will be providing such an indication. At this time, the most recent coefficients for the port which is to receive activity are taken from a coefficient memory or library 29. They are loaded into the echo canceller arithmetic unit for updating a new set of filter coefficients on the incoming signals from the delay line 12 when received signals are actually present. The echo canceller operates in its conventional manner with the normal transmission activity control until the received signal activity ceases. At this time, present values of the coefficients for the port under consideration are returned to the coefficient library 29. The echo canceller filter is then reset with the signal register and accumulator cleared and the filter will then be assigned duty to another port.

When the receive activity for a given port is no longer present, the estimate of the echo level is maintained in the noise average register of the adaptive level detector 20 in FIG. 6. This is associated with the given port to which that detector is connected. This is a normal operation of the threshold detector average control since the receive signal activity level will be 0 at this point and it is necessary to insure that the threshold level be maintained to assure rapid start-up when the next speech burst occurs. When this port is operating without an adaptive filter, the echo estimate signal Ee in FIGS. 6–8 will be set to 0. The threshold detector 28 will monitor the level of the transmitted signal and at the onset of activity will request a transmission channel from the TASI multiplexer. During the course of operation, the noise average of detector 28 will be the background noise from the near end port and the echo generated by the silence noise injected whenever the receive signal activity is not present. The averaging at this threshold level will continue while the port is inactive. As noted earlier, only the additional detector 20 is required as an additional per port function over the conventional TASI system.

It has been demonstrated that the adaptive filter is thus not required for the number of ports in the system but only for the number of transmission channels. Since the port to channel ratio may be from 2 or 3 to 1, this is a considerable savings in the number of filler resources used in such a system. A great savings not only in cost but in terms of processing load is thus achieved.

Figure 8:
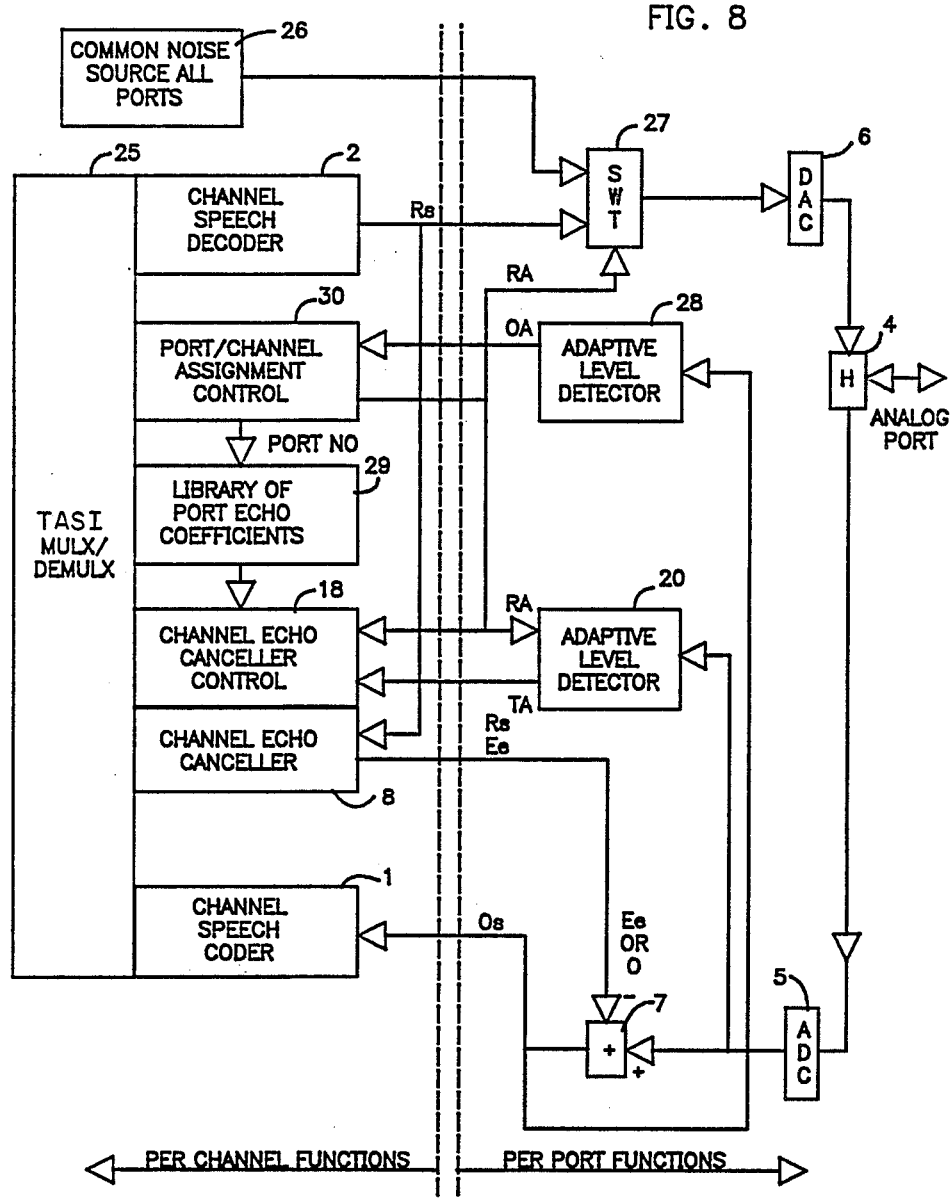
FIG. 8 illustrates a preferred embodiment of the present invention where a multiplexed echo cancellation for time assigned speech interpolation transmission systems is envisioned.

FIG. 8 illustrates a TASI system employing this approach and showing the distribution of function between the transmission channels on one hand and the signaling ports on the other. Note too, that in this structure, the low rate speech coders are also multiplexed across the ports in use. This assumes that the response of the decoders will be less than the hangover time of the threshold detectors. This is true for most low rate coding algorithms presently employed. In this configuration, the functions having the greatest complexity and processing load are required for each transmission channel and the complexity required per port is quite modest. Operation of the system shown in FIG. 8 is quite straightforward with the port and channel assignment control 30 being a normal portion of the TASI multiplex/demultiplex system 25. This control can be used to drive the library of port echo coefficients 29 to load the new coefficients for updating into the channel adaptive filter 8. The other elements in the figure are the same as those shown in FIGS. 3 and 6 where the preferred embodiment of the invention was described for single and multi-channel systems respectively.

Having thus described my invention with reference to several preferred embodiments thereof, it will be understood by those of skill in the art that numerous departures from the specific implementations proposed can be made without departing from the generic concepts and methods described.

Therefore, what is set forth in the following claims is intended by way of description only and not by way of limitation wherefor what is claimed is:

1. An improved method of controlling coefficient calculation in an adaptive filter for an echo canceller comprising steps of:
   detecting received signal activity in a first adaptive level detector;
   providing an output signal from said first adaptive level detector indicative of detecting received signal activity therein;
   detecting combined noise and transmitted signal activity in a second adaptive level detector connected to receive said output signal, having an adaptive threshold level whose adaptive threshold is enabled to adapt by said output signal from said first adaptive level detector, and
   recomputing the coefficients in the adaptive filter when said first adaptive level detector indicates received signal activity and said second level detector indicates no combined noise and transmitted signal activity.

2. A method as described in claim 1 and further comprising:
   a step of supplying an output from said first adaptive level detector to an input of said second adaptive level detector to serve as a control signal; and
   establishing a transmitted signal noise threshold of transmitted signal noise activity in said second adaptive level detector by setting a detection level therein in response to said control signal.

3. A method as described in claim 2, and further comprising steps of:
   comparing in said second adaptive level detector the combined transmitted signal energy level and echo energy level to said transmitted signal noise threshold; and
   providing an output from said second adaptive level detector indicating transmission signal activity only when said transmitted signal energy level exceeds said transmitted signal noise threshold.

4. A method as described in claim 1 and further comprising a step of inhibiting computation of said coefficients for said adaptive filter whenever transmitted signal activity as detected by said second adaptive level detector is present.

5. A method as described in claim 4 and further comprising a step of inhibiting computation of said coefficients whenever both said adaptive level detectors indicate absence of signal activity.

6. Improved apparatus for controlling coefficient recalculation in an adaptive filter of an echo canceller, comprising:
   a first adaptive level detector means for detecting received signal activity at a communication port and having an output signal line for indicating detection of received signal activity; and
   second adaptive level detector means for detecting combined noise and transmitted signal activity at a communication port and having an internally adjustable threshold level of signal detection, said second adaptive level detector means being connected to said output signal line of said first adaptive level detector means and being controlled thereby to adaptively adjust its internal threshold detection level only when said first adaptive level detector means detects received signal activity and said second adaptive level detector detects no combined noise and transmitted signal activity; and
   means for recomputing the coefficients in an adaptive filter when said first adaptive level detector means indicates received signal activity and said second adaptive level detector means indicates no combined noise and transmitted signal activity.

7. Apparatus as described in claim 6, and further comprising:
   means for inhibiting computation of said coefficients for said adaptive filter whenever transmission activity is detected by said second adaptive level detector means.

8. Apparatus as described in claim 7 and further comprising:
   further means for inhibiting computation of said coefficients whenever both said first and second adaptive level detector means indicate the absence of signal activity.

* * * * *